(12) United States Patent
Prahlad et al.

(10) Patent No.: US 9,401,668 B2
(45) Date of Patent: Jul. 26, 2016

(54) MATERIALS FOR ELECTROADHESION AND ELECTROLAMINATES

(75) Inventors: Harsha Prahlad, Cupertino, CA (US); Ronald E. Pelrine, Longmont, CO (US); Annjoe Wong-Foy, San Francisco, CA (US); Roy D. Kornbluh, Palo Alto, CA (US); Brian K. McCoy, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 359 days.

(21) Appl. No.: 13/635,889

(22) PCT Filed: Mar. 18, 2011

(86) PCT No.: PCT/US2011/029101
§ 371 (c)(1),
(2), (4) Date: Sep. 18, 2012

(87) PCT Pub. No.: WO2011/116357
PCT Pub. Date: Sep. 22, 2011

(65) Prior Publication Data
US 2013/0010398 A1      Jan. 10, 2013

Related U.S. Application Data

(60) Provisional application No. 61/315,451, filed on Mar. 19, 2010.

(51) Int. Cl.
*H01L 21/683* (2006.01)
*H01T 23/00* (2006.01)
*H02N 13/00* (2006.01)

(52) U.S. Cl.
CPC ..................................... *H02N 13/00* (2013.01)

(58) Field of Classification Search
CPC ............. H02N 13/00; A61M 16/0816; A61M 16/0683; B62D 55/26
USPC .......................................................... 361/234
See application file for complete search history.

(56) References Cited

U.S. PATENT DOCUMENTS

| | | | | |
|---|---|---|---|---|
| 4,766,515 A | * | 8/1988 | Bollen et al. | 361/234 |
| 6,392,209 B1 | * | 5/2002 | Oppitz | 219/549 |
| 7,034,432 B1 | * | 4/2006 | Pelrine et al. | 310/309 |
| 7,554,787 B2 | * | 6/2009 | Pelrine et al. | 361/234 |
| 7,598,651 B2 | * | 10/2009 | Kornbluh et al. | 310/309 |

(Continued)

FOREIGN PATENT DOCUMENTS

| | | |
|---|---|---|
| EP | 0 401 489 A2 | 12/1990 |
| JP | S63101033 | 5/1988 |

(Continued)

*Primary Examiner* — Thienvu Tran
*Assistant Examiner* — Lucy Thomas
(74) *Attorney, Agent, or Firm* — McDonnell Boehnen Hulbert & Berghoff LLP

(57) ABSTRACT

An electroadhesive device includes an outer surface adapted to interface with a surface of a foreign substrate, a plurality of electrodes, and a semi-conductive insulation material disposed adjacent to at least one of the electrodes. Each electrode has a respective conductive volume and is configured to apply a voltage at a respective location of the outer surface, and the difference in voltage between applied voltages includes an electrostatic adhesion voltage that produces an electrostatic force between the device and the substrate that is suitable to maintain a current position of the device relative to the substrate. The insulation material can be polyurethane or any other suitable material having a resistance of about $10^9$ to $10^{12}$ ohms*m. The insulation material effectively operates to expand the conductive volume of the electrodes when they are actuated.

25 Claims, 9 Drawing Sheets

(56) References Cited

U.S. PATENT DOCUMENTS

| | | |
|---|---|---|
| 2008/0089002 A1 | 4/2008 | Pelrine et al. |
| 2009/0242544 A1 | 10/2009 | Kano |

FOREIGN PATENT DOCUMENTS

| | | |
|---|---|---|
| JP | H07086380 | 3/1995 |
| JP | 2004095665 | 3/2004 |
| JP | 2004349663 | 12/2004 |
| JP | 2006053582 | 2/2006 |
| JP | 2006 120847 A | 5/2006 |
| JP | 2007109827 | 4/2007 |
| JP | 2008103753 | 5/2008 |
| JP | 2009188342 | 8/2009 |
| WO | 2008070201 A2 | 6/2008 |

* cited by examiner

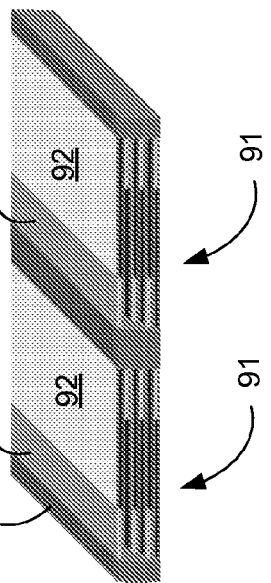
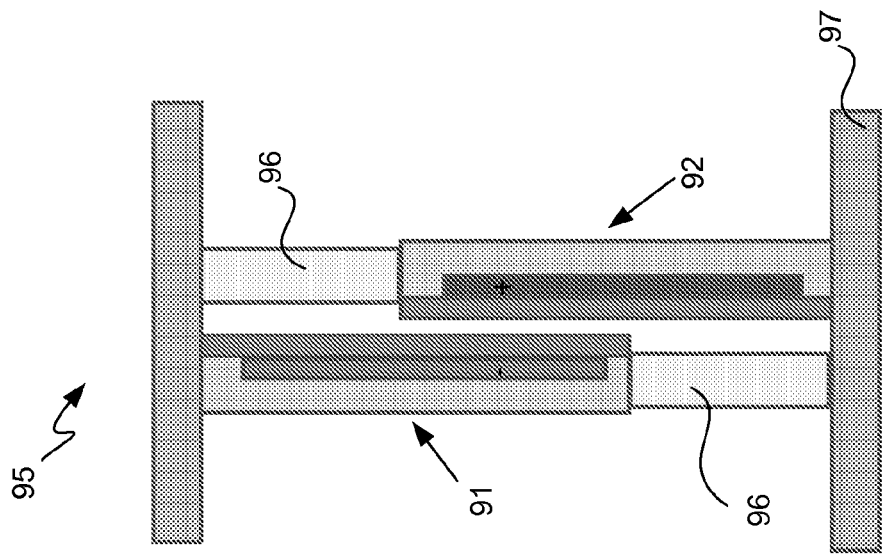
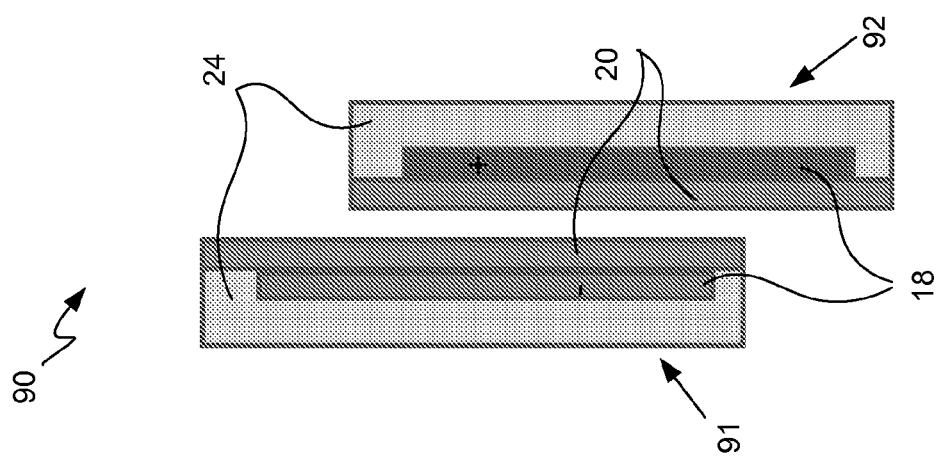
FIG. 4C
FIG. 4B
FIG. 4A

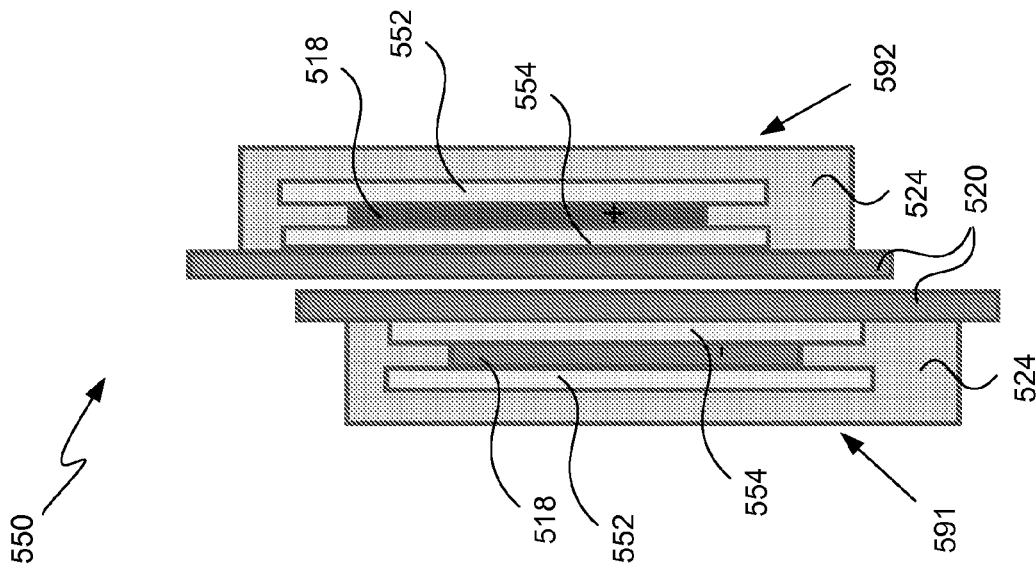
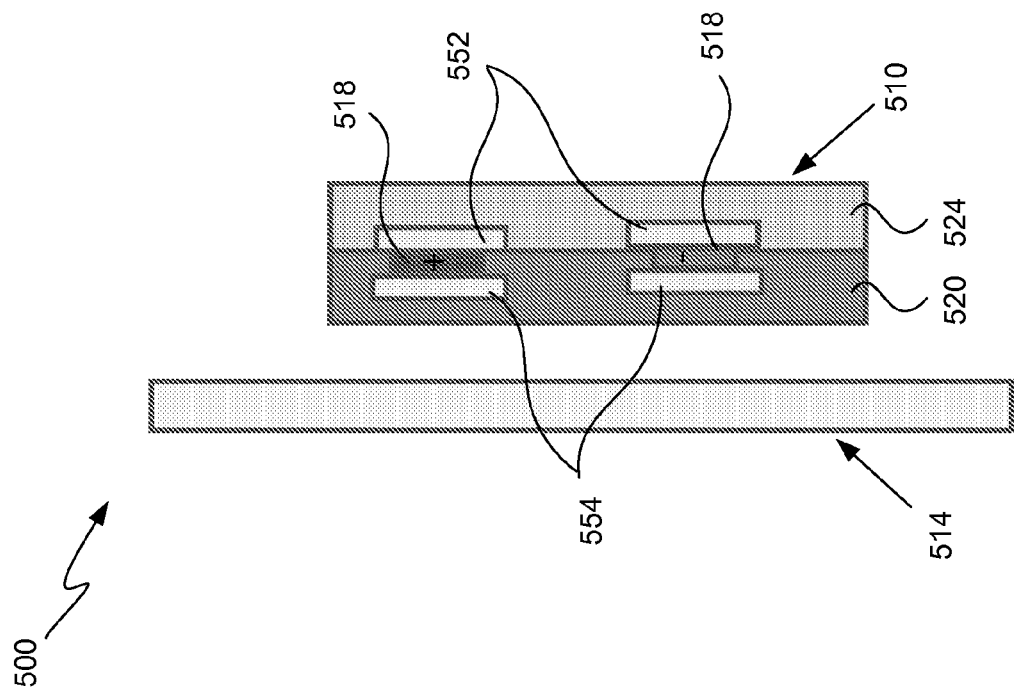

MATERIALS FOR ELECTROADHESION AND ELECTROLAMINATES

CROSS-REFERENCE TO RELATED APPLICATION

This application claims priority to U.S. Provisional Patent Application No. 61/315,451, filed Mar. 19, 2010, and entitled "Materials For Electroadhesion and Electrolaminates," which is incorporated by reference herein in its entirety and for all purposes.

TECHNICAL FIELD

The present invention relates generally to electroadhesion, and more particularly to the use of specialized materials for electroadhesion.

BACKGROUND

Successful controlled adhesion without the use of glues or other adhesives remains a desirable goal in many applications. What might be considered a success in controlled adhesion can be defined as a technology that is controllable, reliable, safe, and robust enough to provide high mechanical pressure with electrical control. In some cases, it may be required to provide this mechanical pressure on a sufficient range of ordinary and every day materials. Such ordinary materials can ideally include those having wet, dusty, highly sloped and/or slippery surfaces. Traditional controlled adhesion technologies, such as chemical adhesives and suction cups, suffer from various drawbacks, including permanency, damage to or residue left at the applied surface, leaks, and a limited effectiveness on wet, dusty or irregular surfaces, among others.

The recent use of electroadhesive forces or electrostatic clamping as an alternative in controlled adhesion applications has proven to be advantageous on several levels. Such electroadhesive forces can be adapted to provide controlled adhesion on an electrically controllable basis without leaving residues or damaging surfaces. They can be fast acting in both on and off states, repeatable and strong, thus allowing repeatable modulation of material properties. Furthermore, a wider variety of dusty, slippery or irregular surfaces can be used with electroadhesive forces without detracting from a useful controlled adhesion outcome.

Of course, the use of electroadhesion, electrostatic clamping, or reversible electrostatic forces for mechanical materials requires the introduction of electricity, which can result in issues with safety, short circuiting, and other problems that are often associated with electrical charges. For example, significantly large voltages and electrical fields tend to be needed in order for a suitable level of electroadhesive or electrostatic forces to be generated. Also, the general use of and ready manipulation of multiple electrodes can present user safety issues, such as where untrained operators are able to use a commercial product that utilizes electroadhesive forces. Exposed electrodes may be a safety hazard in some situations. Traditional materials used for electrical applications can make it difficult to overcome such issues, resulting in product designs that can be overly cumbersome or bulky, so as to account for an appropriate level of user safety.

Although various materials for use in electroadhesive type applications have generally worked well, there is always a desire to provide alternative and improved materials. In particular, what is desirable are electroadhesive systems having materials that allow stronger electrostatic clamping at lower electrical field levels, while also providing for greater safety to operators using the systems. It may also be desirable to have materials that can produce strong adhesion on a repeatable basis using simple power supplies. Further, it may also be desirable to have materials where applied adhesion is released promptly when the clamping power being supplied to the materials is removed.

SUMMARY

It is an advantage of the present invention to provide improved materials for use in electrostatic reversible adhesion, such as those involving electroadhesive and electrolaminate applications. This can be accomplished through the use of semi-conductive insulation materials, such as various polyurethanes, that result in greater electrostatic clamping forces at lower electrical field levels, and without electrically shorting the clamp internally. In addition, the use of an electrostatic dissipative tape allows high voltages to be transferred for electrostatic clamping without requiring a current level that could be harmful to a user. The resulting electrostatic applications can then have exposed electrodes that are safe to handle, with the overall systems having vastly improved performance as well. The use of such improved materials results in lower voltages being needed for the same clamping forces, and the risks of electrical shock being substantially lowered.

In various embodiments of the present invention, an electroadhesive device can include an outer surface adapted to interface with a surface of a foreign substrate, a plurality of electrodes, and a semi-conductive insulation material disposed adjacent to at least one of the electrodes. In some embodiments, two electrodes are used. Each electrode can have a respective conductive volume and be configured to apply a voltage at a respective location of the outer surface, and the difference in voltage between applied voltages includes an electrostatic adhesion voltage that produces an electrostatic force between the device and the substrate that is suitable to maintain a current position of the device relative to the substrate. The insulation material can have a bulk resistivity of about $10^7$ to $10^{13}$ ohms*m, with a more preferable range being about $10^9$ to $10^{12}$ ohms*m.

In various additional embodiments, an electrolaminate system can include a first electrolaminate component, a second separate electrolaminate component, and an insulation material disposed adjacent to at least one of the first electrolaminate component and second electrolaminate component, with the insulation material being formed from a semi-conductive material having a resistance of about $10^7$ to $10^{13}$ ohms*m. Additional separate electrolaminate components may also be used, such as in the formation of a meta-material type system. Each of the separate electrolaminate components can have an outer surface and at least one electrode having a respective conductive volume and configured to apply a respective voltage at its respective outer surface. A given pair of separate electrolaminate components can be adapted to interface with each other such that the difference in voltage between the respective voltages of each can include an electrostatic adhesion voltage that produces an electrostatic force between the electrolaminate components that is suitable to maintain a current position of the electrolaminate components with respect to each other.

In various detailed embodiments, the insulation material effectively operates to expand the conductive volume of the electrodes when they are actuated. Such an effective expansion of the conductive volumes preferably does not result in an electrical short, but in some cases can result in a slight increase in currents consumed by the device. In some embodiments, the insulation material can be disposed between electrodes, such as where the electrodes are embedded within the insulation material. In some embodiments, the insulation material can be disposed between the surface of the foreign substrate and one or more electrodes.

In some embodiments, the insulation material can have a resistance that varies from one location within the insulation material to another. In particular one or more insulation material regions that are closer to a given electrode can have a resistance that is lower than one or more insulation material regions that are farther away from the electrode. In addition, the electrostatic force between the device and the foreign substrate is suitable to maintain a current position of the device relative to the substrate despite the presence of moisture or a particulate disposed between the outer surface and the surface of the foreign substrate. In some embodiments, the insulation material includes a compliant material with an elastic modulus less than about 1 GPa, and in some embodiments, the insulation material is polyurethane.

In various embodiments, the insulation material can include a coating that is sprayed or deposited onto one or more electrodes and/or the surface of the foreign substrate. In some embodiments, the electrodes can include one or more cilium or cut out flaps configured to deform to the surface of the foreign substrate when the electrostatic adhesion voltage is applied. Further, one or more electrodes can have a surface resistance of about 0.1 to 1000 Mohm/square. Various embodiments can also include a highly resistive layer disposed between the electrodes and the insulation material for safety purposes.

In still further embodiments, various methods of adhering an electrostatic device to a substrate or to a second electrostatic device are provided. In various electroadhesion type embodiments, electrodes may be on the same device, which is then adhered against a foreign substrate. In various electrostatic clamping or electrolaminate system embodiments, the electrodes may be on two different material substrates that are designed to clamp to each other. Process steps can include applying an electrostatic adhesion voltage difference between a first electrode at a first location of an outer surface of the device and a second electrode at a second location of the outer surface, utilizing an insulation material disposed adjacent to at least one of the first electrode and the second electrode, wherein said insulation material is formed from a semi-conductive material having a resistance of about $10^7$ to $10^{13}$ ohms*m, adhering the outer surface to a surface of the substrate using an electrostatic attraction force provided by the electrostatic adhesion voltage difference, and maintaining the electrostatic adhesion voltage difference between the first electrode and the second electrode while the outer surface of the device contacts the surface of the substrate. Additional process steps can include spraying or depositing the insulation material as a coating onto one or more electrodes and/or the surface of the foreign substrate. Various details of the foregoing electroadhesive and electrolaminate devices and systems may also apply to such methods.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive electroadhesive and electrolaminate materials and systems. These drawings in no way limit any changes in form and detail that may be made to the invention by one skilled in the art without departing from the spirit and scope of the invention.

FIG. 4A illustrates in side cross-sectional view an exemplary electrostatic clamping configuration according to one embodiment of the present invention.

FIG. 4B illustrates in side cross-sectional view the exemplary electrostatic clamping configuration of FIG. 4A installed within a larger system according to one embodiment of the present invention.

FIG. 4C illustrates in top perspective view an electrolaminate configuration formed by multiple stacked iterations of the electrostatic clamping figure FIG. 4A according to one embodiment of the present invention.

FIG. 9A illustrates in side cross-sectional view an exemplary electroadhesion configuration utilizing multiple layered electrodes according to one embodiment of the present invention.

FIG. 9B illustrates in side cross-sectional view an exemplary electrostatic clamping configuration utilizing multiple layered electrodes according to one embodiment of the present invention.

DETAILED DESCRIPTION

Figure 1A:
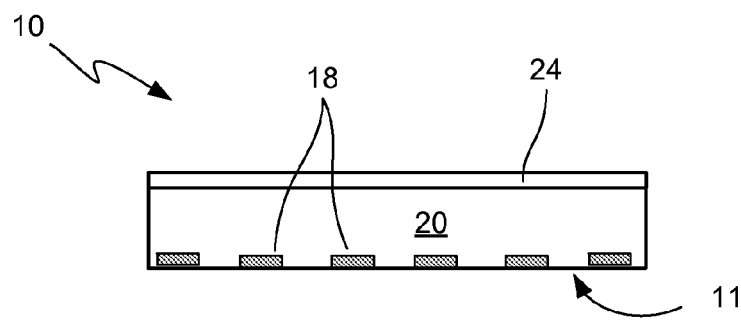
FIG. 1A illustrates in side cross-sectional view an exemplary electroadhesive end effector according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to both electroadhesion type devices and electrolaminate type systems. It will be understood that electroadhesion type devices generally use compliant materials to clamp to a foreign substrate, while electrolaminate systems use multiple compliant materials to clamp to each other. The various materials provided herein with respect to electrodes and semi-conductive insulators can be used with either or both of electroadhesion type devices as well as electrostatic clamping or electrolaminate type systems.

For example, an electroadhesive device or system be adapted to clamp, hold, move or otherwise handle a wide variety of objects, including small, dirty and/or fragile objects. Such handling can be accomplished with minimal danger to an ordinary operator or user, due to the use of specialized materials in the electrodes and/or other components of the electroadhesive system. In addition to the clamping, holding, moving and handling of items, further applications of the provided electroadhesive systems are also possible, such that it will be understood that the provided electroadhesive system is not limited to use to such applications. For example, the same or similar electroadhesive system components can be used to adhere together two external and dissimilar objects. Similarly, an electrostatic clamping device can be used to produce variable stiffnesss in a material. It can also be used as an electrostatic brake in a rotating joint to lock the joint mechanically in place, such as to rigidize a hinge, or as an electrostatic clutch, where motion and forces are selectively transferred from one object to another depending on whether the two objects are electrostatically clamped to each other or not. Additional alternative applications may also be practiced, as will be readily appreciated.

Electroadhesion

As the term is used herein, 'electroadhesion' refers to the mechanical coupling of two objects using electrostatic forces. Electroadhesion as described herein uses electrical control of these electrostatic forces to permit temporary and detachable attachment between two objects. This electrostatic adhesion holds two surfaces of these objects together or increases the traction or friction between two surfaces due to electrostatic forces created by an applied electric field. Although electrostatic clamping has traditionally been limited to holding two flat, smooth and generally conductive surfaces separated by a highly insulating material together, the present invention involves electroadhesion devices and techniques that do not limit the material properties or surface roughness of the objects subject to electroadhesive forces and handling.

Turning first to FIG. 1A, an exemplary electroadhesive end effector according to one embodiment of the present invention is illustrated in elevated cross-sectional view. Electroadhesive end effector 10 includes one or more electrodes 18 located at or near an "electroadhesive gripping surface" 11 thereof, as well as an insulating material 20 between electrodes and a backing 24 or other supporting structural component. For purposes of illustration, electroadhesive end effector 10 is shown as having six electrodes in three pairs, although it will be readily appreciated that more or fewer electrodes can be used in a given electroadhesive end effector. Where only a single electrode is used in a given electroadhesive end effector, a complimentary electroadhesive end effector having at least one electrode of the opposite polarity is preferably used therewith. With respect to size, electroadhesive end effector 10 is substantially scale invariant. That is, electroadhesive end effector sizes may range from less than 1 square centimeter to greater than several meters in surface area. Even larger and smaller surface areas also possible, and may be sized to the needs of a given application.

Figure 1B:
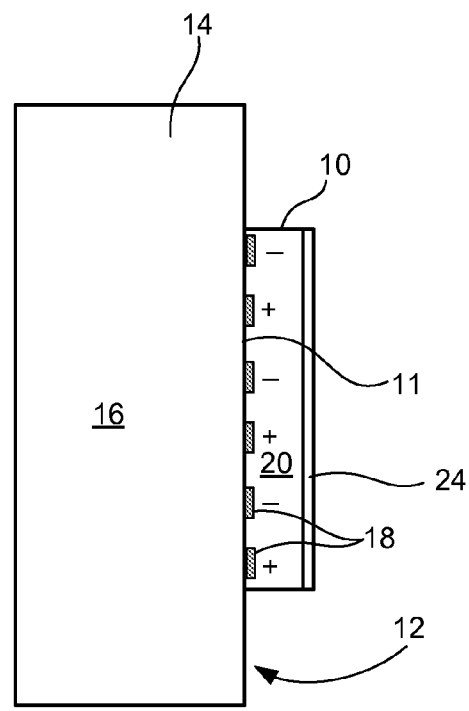
FIG. 1B illustrates in side cross-sectional view the exemplary electroadhesive end effector of FIG. 1A adhered to a foreign object according to one embodiment of the present invention.

FIG. 1B depicts in elevated cross-sectional view the exemplary electroadhesive end effector 10 of FIG. 1A adhered to a foreign object 14 according to one embodiment of the present invention. Foreign object 14 includes surface 12 and inner material 16. Electroadhesive gripping surface 11 of electroadhesive end effector 10 is placed against or nearby surface 12 of foreign object 14. An electrostatic adhesion voltage is then applied via electrodes 18 using external control electronics (not shown) in electrical communication with the electrodes 18. As shown in FIG. 1B, the electrostatic adhesion voltage uses alternating positive and negative charges on neighboring electrodes 18. As result of the voltage difference between electrodes 18, one or more electroadhesive forces are generated, which electroadhesive forces act to hold the electroadhesive end effector 10 and foreign object 14 against each other. Due to the nature of the forces being applied, it will be readily appreciated that actual contact between electroadhesive end effector 10 and foreign object 14 is not necessary. For example, a piece of paper, thin film, or other material or substrate may be placed between electroadhesive end effector 10 and foreign object 14. Furthermore, although the term "contact" is used herein to denote the interaction between an electroadhesive end effector and a foreign object, it will be understood that actual direct surface to surface contact is not always required, such that one or more thin objects such as an insulator, can be disposed between an end effector or electroadhesive gripping surface and the foreign object. In some embodiments such an insulator between the gripping surface and foreign object can be a part of the end effector, while in others it can be a separate item or device.

Figure 1C:
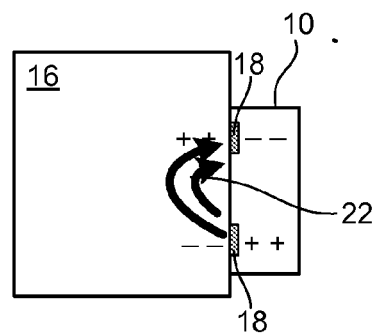
FIG. 1C illustrates in side cross-sectional close-up view an electric field formed in the foreign object of FIG. 1B as result of the voltage difference between electrodes in the adhered exemplary electroadhesive end effector according to one embodiment of the present invention.

FIG. 1C illustrates in elevated cross-sectional close-up view an electric field formed in the foreign object of FIG. 1B as result of the voltage difference between electrodes in the adhered exemplary electroadhesive end effector 10. While the electroadhesive end effector 10 is placed against foreign object 14 and an electrostatic adhesion voltage is applied, an electric field 22 forms in the inner material 16 of the foreign object 14. The electric field 22 locally polarizes inner material 16 or induces direct charges on material 16 locally opposite to the charge on the electrodes of the end effector 18 and thus causes electrostatic adhesion between the electrodes 18 (and end effector 10) and the induced charges on the foreign object 16. The induced charges may be the result of a dielectric polarization or from weakly conductive materials and electrostatic induction of charge. In the event that the inner material 16 is a strong conductor, such as copper for example, the induced charges may completely cancel the electric field 22. In this case the internal electric field 22 is zero, but the induced charges nonetheless still form and provide electrostatic force to the electroadhesive end effector.

Thus, the electroadhesive adhesion voltage provides an overall electrostatic force, between the electroadhesive end effector 10 and inner material 16 beneath surface 12 of foreign object 14, which electrostatic force maintains the current position of the electroadhesive end effector relative to the surface of the foreign object. The overall electrostatic force may be sufficient to overcome the gravitational pull on the foreign object 14, such that the electroadhesive end effector 10 may be used to hold the foreign object aloft. In various embodiments, a plurality of electroadhesive end effectors may be placed against foreign object 14, such that additional electrostatic forces against the object can be provided. The combination of electrostatic forces may be sufficient to lift, move, pick and place, or otherwise handle the foreign object. Electroadhesive end effector 10 may also be attached to other structures and hold these additional structures aloft, or it may be used on sloped or slippery surfaces to increase normal friction forces Removal of the electrostatic adhesion voltages from electrodes 18 ceases the electrostatic adhesion force between electroadhesive end effector 10 and the surface 12 of foreign object 14. Thus, when there is no electrostatic adhesion voltage between electrodes 18, electroadhesive end effector 10 can move more readily relative to surface 12. This condition allows the electroadhesive end effector 10 to move before and after an electrostatic adhesion voltage is applied. Well controlled electrical activation and de-activation enables fast adhesion and detachment, such as response times less than about 50 milliseconds, for example, while consuming relatively small amounts of power. Larger release times may also be valuable in many applications.

Electroadhesive end effector 10 includes electrodes 18 on an outside surface 11 of an insulating material 20. This embodiment is well suited for controlled attachment to insulating and weakly conductive inner materials 14 of various foreign objects 16. Other electroadhesive end effector 10 relationships between electrodes 18 and insulating materials 20 are also contemplated and suitable for use with a broader range of materials, including conductive materials. For example, a thin electrically insulating material (not shown) can be located on the surfaces of the electrodes where surface 12 is on a metallic object. As will be readily appreciated, a shorter distance between surfaces 11 and 12 results in a stronger electroadhesive force between the objects. Accordingly, a deformable surface 11 adapted to at least partially conform to the surface 12 of the foreign object 14 can be used.

As the term is used herein, an electrostatic adhesion voltage refers to a voltage that produces a suitable electrostatic force to couple electroadhesive end effector 10 to a foreign object 14. The minimum voltage needed for electroadhesive end effector 10 will vary with a number of factors, such as: the size of electroadhesive end effector 10, the material conductivity and spacing of electrodes 18, the insulating material 20, the foreign object material 16, the presence of any disturbances to electroadhesion such as dust, other particulates or moisture, the weight of any objects being supported by the electroadhesive force, compliance of the electroadhesive device, the dielectric and resistivity properties of the foreign object, and the relevant gaps between electrodes and foreign object surface. In one embodiment, the electrostatic adhesion voltage includes a differential voltage between the electrodes 18 that is between about 500 volts and about 15 kilovolts. Even lower voltages may be used in micro applications. In one embodiment, the differential voltage is between about 2 kilovolts and about 5 kilovolts. Voltage for one electrode can be zero. Alternating positive and negative charges may also be applied to adjacent electrodes 18. The voltage on a single electrode may be varied in time, and in particular may be alternated between positive and negative charge so as to not develop substantial long-term charging of the foreign object. The resultant clamping forces will vary with the specifics of a particular electroadhesive end effector 10, the material it adheres to, any particulate disturbances, surface roughness, and so forth. In general, electroadhesion as described herein provides a wide range of clamping pressures, generally defined as the attractive force applied by the electroadhesive end effector divided by the area thereof in contact with the foreign object The actual electroadhesion forces and pressure will vary with design and a number of factors. In one embodiment, electroadhesive end effector 10 provides electroadhesive attraction pressures between about 0.7 kPa (about 0.1 psi) and about 70 kPa (about 10 psi), although other amounts and ranges are certainly possible. The amount of force needed for a particular application may be readily achieved by varying the area of the contacting surfaces, varying the applied voltage, and/or varying the distance between the electrodes and foreign object surface, although other relevant factors may also be manipulated as desired.

Because an electrostatic adhesion force is the primary force used to hold, move or otherwise manipulate, through surface adhesion, either a foreign object or two objects to each other, rather than a traditional mechanical or "crushing" force, the electroadhesive end effector 10 can be used in a broader set of applications. For example, electroadhesive end effector 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters. In addition, electroadhesive end effector 10 can be used on objects that are dusty or dirty, as well as objects that are fragile. Objects of varying sizes and shapes can also be handled by one or more electroadhesive end effectors, as set forth in greater detail below. Various additional details and embodiments regarding electroadhesion and applications thereof can be found at, for example, commonly owned U.S. Pat. Nos. 7,551,419; 7,554,787; and 7,773,363, which are incorporated by reference herein in their entirety and for all purposes.

Electroadhesive End Effectors

Although electroadhesive end effector 10 having electroadhesive gripping surface 11 of FIG. 1A is shown as having six electrodes 18, it will be understood that a given electroadhesive end effector or gripping surface can have just a single electrode. Furthermore, it will be readily appreciated that a given electroadhesive end effector can have a plurality of different electroadhesive gripping surfaces, with each separate electroadhesive gripping surface having at least one electrode and being adapted to be placed against or in close proximity to the foreign object to be gripped. Although the terms electroadhesive end effector, electroadhesive gripping unit and electroadhesive gripping surface are all used herein to designate electroadhesive components of interest, it will be understood that these various terms can be used interchangeably in various contexts. In particular, while a given "end effector" might comprise numerous distinct "gripping surfaces," these different gripping surfaces might also be considered separate end effectors themselves.

Figure 2A:
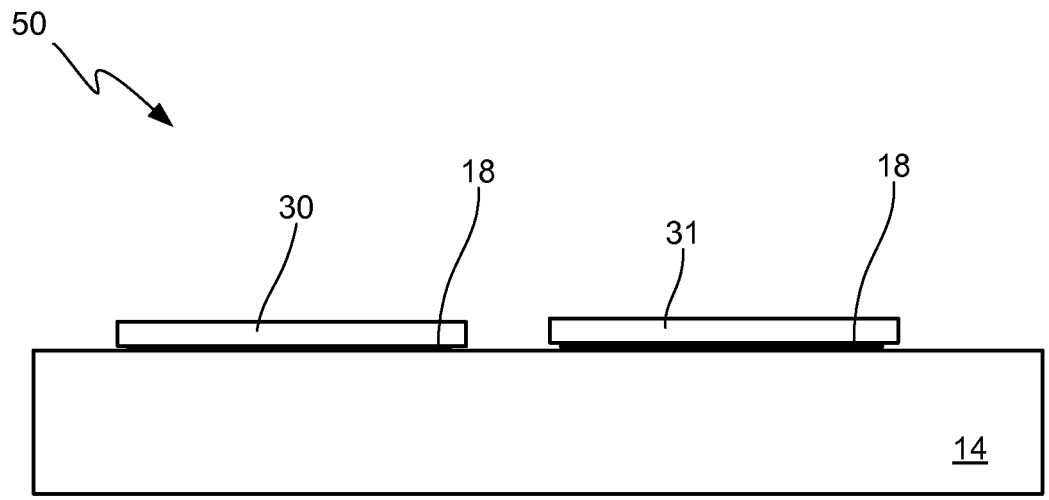
FIG. 2A illustrates in side cross-sectional view an exemplary pair of electroadhesive gripping surfaces or end effectors having single electrodes thereon according to one embodiment of the present invention.
Figure 2B:
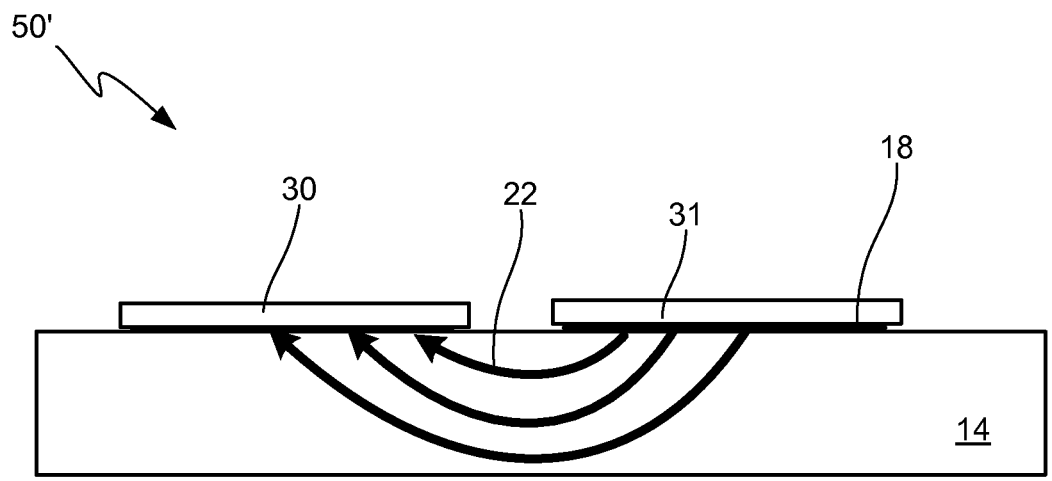
FIG. 2B illustrates in side cross-sectional view the exemplary pair of electroadhesive gripping surfaces or end effectors of FIG. 2A with voltage applied thereto according to one embodiment of the present invention.

Referring to FIGS. 2A and 2B, an exemplary pair of electroadhesive end effectors or gripping surfaces having single electrodes thereon is shown in side cross-sectional view. FIG. 2A depicts electroadhesive gripping system 50 having electroadhesive end effectors or gripping surfaces 30, 31 that are in contact with the surface of a foreign object 16, while FIG. 2B depicts activated electroadhesive gripping system 50' with the end effectors or gripping surfaces having voltage applied thereto. Electroadhesive gripping system 50 includes two electroadhesive end effectors or gripping surfaces 30, 31 that directly contact the foreign object 16. Each electroadhesive end effector or gripping surface 30, 31 has a single electrode 18 coupled thereto. In such cases, the electroadhesive gripping system can be designed to use the foreign object as an insulation material. When voltage is applied, an electric field 22 forms within foreign object 14, and an electrostatic force between the electroadhesive end effectors or gripping surfaces 30, 31 and the foreign object is created. Various embodiments that include numerous of these single electrode electroadhesive end effectors can be used, as will be readily appreciated.

In some embodiments, an electroadhesive gripping surface can take the form of a flat panel or sheet having a plurality of electrodes thereon. In other embodiments, the gripping surface can take a fixed shape that is matched to the geometry of the foreign object most commonly lifted or handled. For example, a curved geometry can be used to match the geometry of a cylindrical paint can or soda can. The electrodes may be enhanced by various means, such as by being patterned on an adhesive device surface to improve electroadhesive performance, or by making them using soft or flexible materials to increase compliance and thus conformance to irregular surfaces on foreign objects.

Figure 3A:
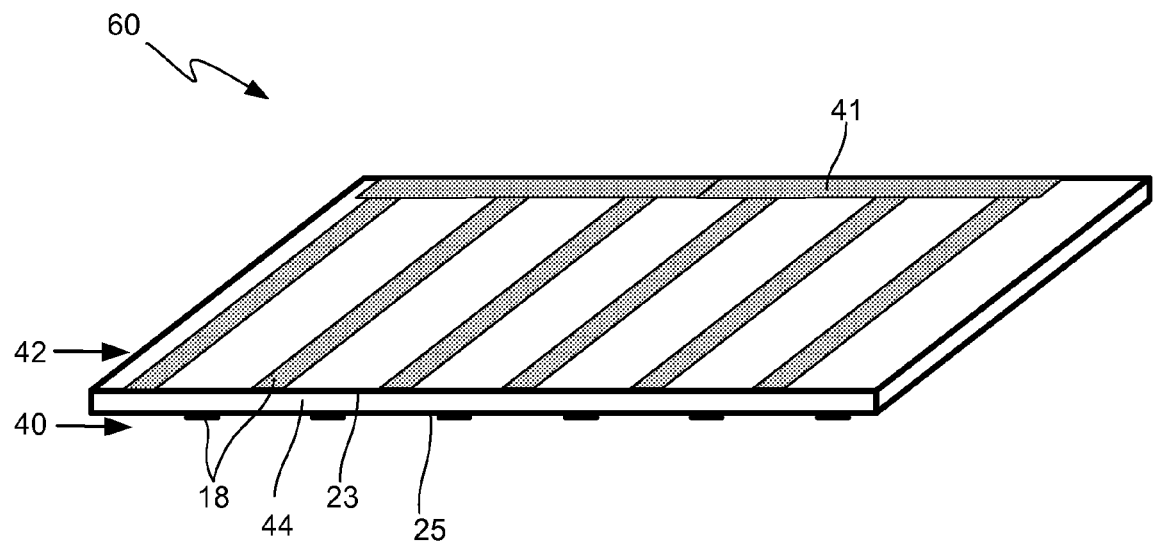
FIG. 3A illustrates in top perspective view an exemplary electroadhesive gripping surface in the form of a sheet with electrodes patterned on top and bottom surfaces thereof according to one embodiment of the present invention.
Figure 3B:
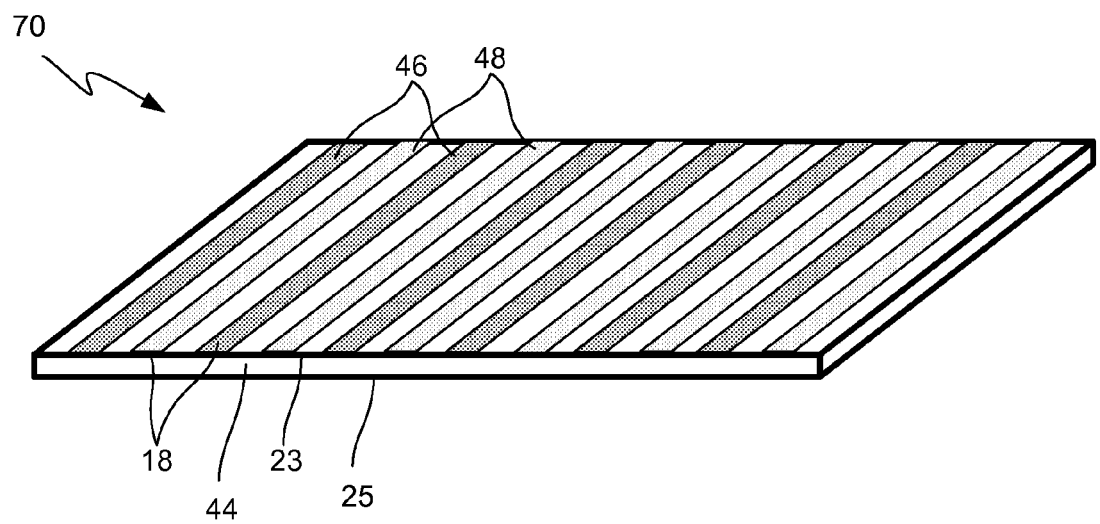
FIG. 3B illustrates in top perspective view an alternative exemplary electroadhesive gripping surface in the form of a sheet with electrodes patterned on a single surface thereof according to one embodiment of the present invention.

Continuing with FIGS. 3A and 3B, two examples of electroadhesive gripping surfaces in the form of flat panels or sheets with electrodes patterned on surfaces thereof are shown in top perspective view. FIG. 3A shows electroadhesive gripping surface 60 in the form of a sheet or flat panel with electrodes 18 patterned on top and bottom surfaces thereof. Top and bottom electrodes sets 40 and 42 are interdigitated on opposite sides of an insulating layer 44. In some cases, insulating layer 244 can be formed of a stiff or rigid material. In some cases, the electrodes as well as the insulating layer 44 may be compliant and composed of a polymer, such as an acrylic elastomer, to increase compliance. In one preferred embodiment the modulus of the polymer is below about 10 MPa and in another preferred embodiment it is more specifically below about 1 MPa. Various types of compliant electrodes suitable for use with the present invention are generally known, and examples are described in commonly owned U.S. Pat. No. 7,034,432, which is incorporated by reference herein in its entirety and for all purposes.

Electrode set 42 is disposed on a top surface 23 of insulating layer 44, and includes an array of linear patterned electrodes 18. A common electrode 41 electrically couples electrodes 18 in set 42 and permits electrical communication with all the electrodes 18 in set 42 using a single input lead to common electrode 41. Electrode set 40 is disposed on a bottom surface 25 of insulating layer 44, and includes a second array of linear patterned electrodes 18 that is laterally displaced from electrodes 18 on the top surface. Bottom electrode set 40 may also include a common electrode (not shown). Electrodes can be patterned on opposite sides of an insulating layer 44 to increase the ability of the electroadhesive end effector 60 to withstand higher voltage differences without being limited by breakdown in the air gap between the electrodes, as will be readily appreciated.

Alternatively, electrodes may also be patterned on the same surface of the insulating layer, such as that which is shown in FIG. 3B. As shown, electroadhesive gripping surface 70 comprises a sheet or flat panel with electrodes 18 patterned only on one surface thereof. Electroadhesive gripping surface 70 can be substantially similar to electroadhesive gripping surface 60 of FIG. 3A, except that electrodes sets 46 and 48 are interdigitated on the same surface 23 of a compliant insulating layer 44. No electrodes are located on the bottom surface 25 of insulating layer 44. This particular embodiment decreases the distance between the positive electrodes 18 in set 46 and negative electrodes 18 in set 48, and allows the placement of both sets of electrodes on the same surface of electroadhesive gripping surface 70. Functionally, this eliminates the spacing between the electrodes sets 46 and 48 due to insulating layer 44, as in embodiment 60. It also eliminates the gap between one set of electrodes (previously on bottom surface 25) and the foreign object surface when the top surface 23 adheres to the foreign object surface. Although either embodiment 60 or 70 can be used, these changes in the latter embodiment 70 do increase the electroadhesive forces between electroadhesive gripping surface 70 and the subject foreign object to be handled.

In some embodiments, an electroadhesive end effector or gripping surface may comprise a sheet or veil type grasper that is substantially flexible in nature. In such embodiments, either no backing structure or a substantially flexible backing structure can be used, such that all or a portion of the veil type end effector or gripping surface can substantially flex or otherwise conform to a foreign object or objects, as may be desired for a given application. Creating electroadhesive end effectors that facilitate such conforming or compliance to a foreign object can be achieved, for example, by forming the electroadhesive layer or gripping surface out of thin materials, by using foam or elastic materials, by butting out flaps or extensions from a primary electroadhesive sheet, or by applying the sheet only to a few selected underlying locations, rather than to an entire rigid backing, among other possibilities.

Although the foregoing exemplary embodiments for electroadhesive gripping surfaces in the form of flat panels or sheets depict bars or stripes for electrodes, it will be understood that any suitable pattern for electrodes could also be used for such a sheet-type electroadhesive gripping surface. For example, a sheet-type electroadhesive gripping surface could have electrodes in the form of discrete squares or circles that are distributed about the sheet and polarized in an appropriate manner, such as in an evenly spaced "polka-dot" style pattern. Other examples such as two sets of electrodes patterned as offset spirals, can also be used. As one particular example, where a thin and flexible material is used for the insulating layer, such as a polymer, and where electrodes are distributed thereabout in the form of discrete discs, a resulting flexible and compliant electroadhesive gripping surface "blanket" would be able to conform to the irregular surfaces of a relatively large object while providing numerous different and discrete electroadhesive forces thereto during voltage application.

Although the foregoing examples have been limited to foreign objects having flat surfaces, particularly thin sheets and the like, a wide variety of different foreign objects can be gripped and handled through the use of such electroadhesive end effectors. In particular, the strategic use of multiple electroadhesive end effectors can overcome many of the drawbacks associated with traditional mechanical pick and place processes, such as for robotics or other manufacturing applications. Further examples and details for various additional end effectors and applications thereof can be found at, for example, commonly owned U.S. patent application Ser. No. 12/762,260, which is incorporated by reference herein in its entirety and for all purposes.

Electrolaminate Configurations

While the foregoing electroadhesion type devices and systems involve the use of an electroadhesive device that clamps to foreign objects, additional electrostatic clamping and electrolaminate systems can involve the clamping of such devices to each other. Various examples of basic electrostatic clamping and electrolaminate configurations are provided in FIGS. 4A through 4C. With respect to the various electrode and insulator materials and properties provided in greater detail below, it will be understood that such items can also be applied to electrostatic clamping and electrolaminate systems as well.

Continuing now with FIG. 4A, an exemplary electrostatic clamping configuration according to one embodiment of the present invention is illustrated in side cross-sectional view. Electrostatic clamping system 90 includes a first clamping structure or electrolaminate component 91 and a second clamping structure or electrolaminate component 92. As shown, component 91 has a single negatively charged electrode, while component 92 has a single positively charged electrode. Other arrangements having further electrodes are also possible. Each of the clamping structures or units can include at least one electrode 18, an insulating backing material 24, and an insulating layer 20 disposed on an interfacing region of its respective electrode. Further clamping structures or units may also be added, as may be desirable for a given application. As noted above, system 90 is designed such that the various clamping structures or units clamp to each other rather than to foreign objects.

In various embodiments corresponding to the more detailed materials disclosed below, one or both of the clamping structures 90, 91 can include an insulating layer 20 that is formed from a semi-conductive material. Further, one or both of the clamping structures can include a backing material 24 that is similarly formed from a semi-conductive material, which may be the same or different from the material in backing material 24. For example, the electrode may be embedded within or affixed to backing material 24, while insulating layer 20 is deposited or sprayed upon the electrode surface 18. In addition, one or both of the clamping structures can include a flexible or compliant portion, which can typically be insulating layer 20. Further clamping structures or components can be similarly constructed and arranged.

FIG. 4B illustrates in side cross-sectional view the exemplary electrostatic clamping configuration of FIG. 4A installed within a larger system according to one embodiment of the present invention. System 95 includes clamping system 90, as well as a plurality of optional elastic material extenders 96 that can be laterally coupled thereto. Each of these units can then be coupled or otherwise arranged within a larger framework 97 that is adapted to hold multiple structures together.

FIG. 4C illustrates in top perspective view an electrolaminate configuration formed by multiple stacked iterations of the electrostatic clamping figure FIG. 4A according to one embodiment of the present invention. Electrolaminate system 99 includes a plurality of stacked electrolaminate components 91, 92. Such components can be stacked in alternating fashion, or otherwise arranged such that suitable alignments of positive to negative electrodes can be formed. Elastic material extenders 96 can be included to help mechanically couple each of the stacked electrolaminate components 91, 92 within the overall system, which can also include a general mechanical framework 97.

Other applications of controllable adhesion are in the development of mechanical meta-materials, various details and properties for which are provided in, for example, commonly owned U.S. Pat. Nos. 7,598,651 and 7,598,652, which are incorporated by reference herein in its entirety and for all purposes.

Electroadhesive and Electrolaminate Insulator Materials

One characteristic to the use of electroadhesion, such as that which is set forth in the foregoing examples, is the need for relatively large voltages in order to create a sufficient electroadhesive force. While the amount of current can be very small so as to reduce the level of danger, the existence of such large voltages can be troublesome depending upon the circumstances. For example, where it may become desirable to use a standard 110 V power source instead of a battery for a given application, problems or defects in the device circuitry might result in a dangerous condition. Having exposed electrodes may not be desirable in some cases then, unless the specialized electrode materials described herein are used. Also, it would be preferable if the amount of voltage could be reduced for some applications, such that a safe and reliable system is achieved. In other cases, it may be desirable to use a thick insulation layer in order to provide improved mechanical robustness of abrasion resistance. It may desirable in some cases to implement this enhanced thickness without proportionately increasing the voltage required to drive the electrostatic clamping. Such improved systems can be achieved through the use of specialized electroadhesive materials and designs, as set forth herein.

Figure 5A:
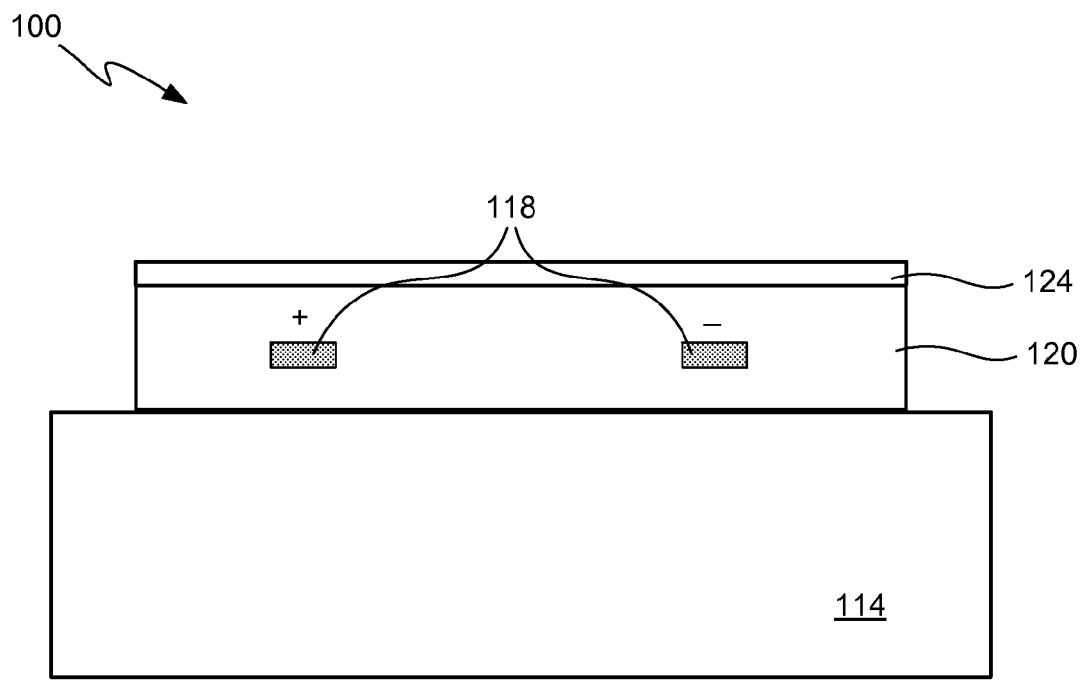
FIG. 5A illustrates in side cross-sectional view an exemplary electroadhesive end effector having a pair of electrodes embedded within a semi-conductive insulation material according to one embodiment of the present invention.

Turning next to FIG. 5A, an exemplary electroadhesive end effector having a pair of electrodes embedded within a semi-conductive insulation material is shown in side cross-sectional view. Again, while the following illustrative examples are being provided with respect to various electroadhesive applications, it will be readily appreciated that the same or substantially similar principles and materials for insulators and electrodes can be provided for electrolaminate applications as well. Electroadhesive end effector 100 includes a pair of electrodes 118 embedded in an insulation material 120, a rigid backing 124, and a lower surface that is in contact with the surface of a foreign object 114. Electrodes 118 can be electrically conductive, while backing 124 is not electrically conductive. Electrodes 118 can also be very resistive for safety purposes, with surface resistivities that can range from 0.1 to 1000 Mohms/square. More particularly, electrode surface resistances ranging from 10 to 100 Mohms/square are thought to work well.

The optimum resistance of the electrodes typically depends on the electrode pattern that is optimal for the material to which it adheres. For example, electrodes that are shaped as narrow and long lines may require lower surface resistances than those having broader and shorter regions.

Examplary electrode materials can include electrostatic dissipative tape ("ESD tape"), such as 3M 40. Other electrodes can be constructed through the mixture of conductive particles, such as carbon, with polymeric binders, such as curable polymers. The insulation layer 120 can be formed from a semi-conductive insulation material, such as polyurethane or various rubbers, for example. Further examples and applications for such semi-conductive materials are provided in greater detail below. Several benefits can be realized through the use of such semi-conductive materials for an insulator.

Figure 5B:
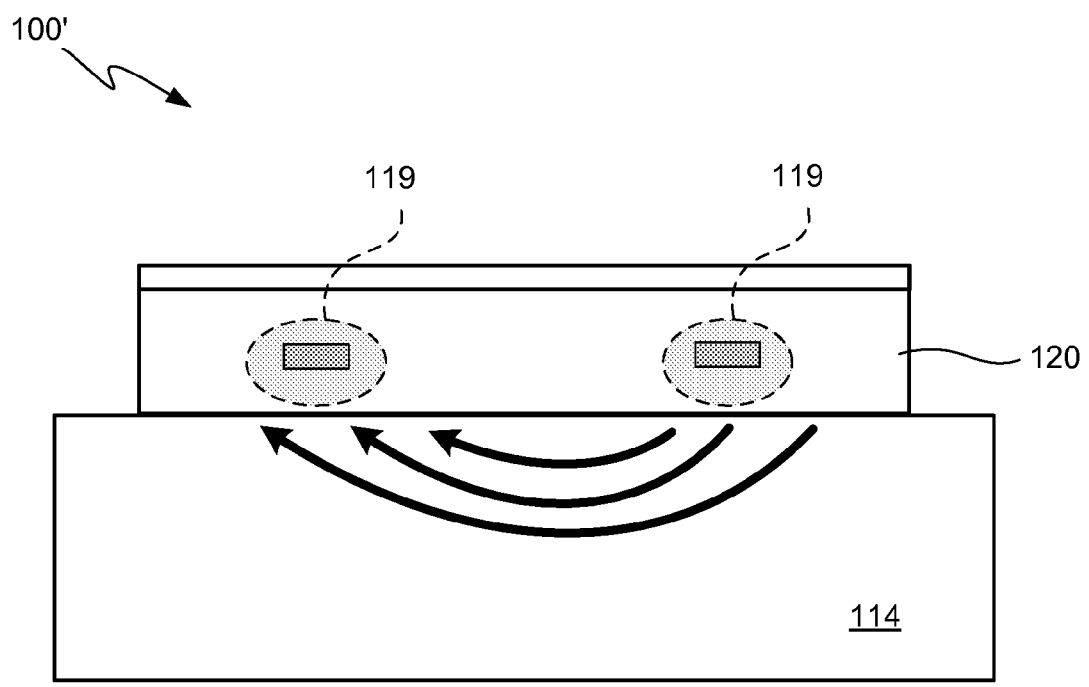
FIG. 5B illustrates in side cross-sectional view an electric field created in the exemplary electroadhesive end effector of FIG. 4A as it is actuated and adhered to a foreign object according to one embodiment of the present invention.

Such benefits can be observed in FIG. 5B, which depicts an electric field that is generated in the exemplary electroadhesive end effector of FIG. 5A as it is actuated and adhered to a foreign object. As shown, electroadhesive end effector 100' generally represents what occurs when end effector 100 is electrically actuated such that an electrical field from one electrode to the other is created. The conductive electrodes are surrounded by a polyurethane or other semi-conductive material 120, which is sufficiently conductive to cause most of the electric field at the interface between the clamp and the substrate, but not so conductive that it shorts or causes excessive power dissipation in the electroadhesive clamp. In particular, the location of a particular portion of semi-conductive material can be dispositive as to whether or not it effectively conducts or carries some charge.

In many cases related to electroadhesion, it is desirable to have a material that also has a high surface resistance (greater than $10^{12}$ ohm/square for example), so that the semi-conductive material projects the electrode charge through its thickness but not so much between one electrode and the next. In a more traditional electrostatic clamping configuration, the surface resistance may be less important. In effect, the effective region or volume of each electrode is extended somewhat into the semi-conductive insulation material. Because the insulation material does not fully break down throughout, no internal electrical short is created as a result of this partial conversion to conductivity of the material that immediately surrounds the electrodes. Of course, such a non-shorting result requires that the electrodes be adequately spaced from each other, as will be readily appreciated.

Various benefits can be appreciated as a result of this phenomenon when using semi-conductive materials as insulators in electroadhesion applications. While the introduction of an insulation layer over an electrode for safety purposes tends to reduce performance by distancing the electrodes from the foreign substrate for some substrate materials, the effective extension of the electrode into some of the insulation material tends to offset these greater distances between electrodes and the foreign substrate. In addition, such semi-conductive materials can be operated with simple direct current ("DC") power supplies, while exhibiting good adhesion and release characteristics, and do not require a substantial amount of power or complicated alternating current ("AC") power supplies to be able to work reliably.

It has also been found that use of semi-conductive materials for an insulation layer actually enhances the electrostatic clamping forces at lower electrical field levels, and without requiring a current level that could be dangerous for a user. This increased clamping force is likely attributable to the Johnsen-Rahbek effect that takes place at the boundary between the metal electrode and the surrounding semi-conductive material. Accordingly, lower voltages and currents can be used to achieve the same clamping forces when using a semi-conductive insulator rather than a fully dielectric insulator.

Although it has been determined that polyurethanes work particularly well as semi-conductive materials for this specific application, various other materials may also be used. Such semi-conductive materials can typically have a bulk resistivity that ranges from about $10^7$ to $10^{13}$ ohms*m, with a more preferable range being about $10^9$ to $10^{12}$ ohms*m. In particular, various polyurethanes, nitrile halogenated or latex rubbers and certain silicones, for example, can be used as suitable insulating materials for the disclosed electroadhesive applications. One particular example of a material that works well is the Deerfield polyurethane PT7811. In other cases, it is possible to introduce additive particles, dopants or solutions to enhance the conductivity of an otherwise insulating polymer. These particles could include carbon, quaternary salts, or plasticizers such as DiOctyl Phthalate ("DOP") or DilsoOctyl Phthalate ("DIOP"). Applications using such materials have been able to achieve clamping forces up to about 70 psi. In embodiments that utilize a simple coating over the electrodes rather than a full insulating layer, a thickness of about 10 to 30 micrometers is considered to work well. In other applications, however, the use of the semiconductive insulators allows the use of insulating layers that are 0.1 to 3 mm thick. In various embodiments, the insulation material can include a compliant material with an elastic modulus less than about 1 GPa, which can facilitate better clamping.

Although the foregoing illustrative example of a semi-conductive insulator involved the use of electrodes that are embedded within the insulator material, it will be readily appreciated that other arrangements and configurations using such material as a semi-conductive insulator can also be used. Moving now to FIG. 6A, an alternative exemplary electroadhesive end effector having a pair of electrodes situated proximate a semi-conductive insulation material is similarly shown in side cross-sectional view. Similar to the foregoing embodiment, electroadhesive end effector 200 includes a pair of electrodes 218 adapted to provide an electroadhesive force with respect to a foreign object 214. Electrodes 218 can be electrically conductive, while backing or upper portion 224 is not electrically conductive. Unlike the foregoing embodiment, the electrodes are not embedded within an insulation layer 220 formed from a semi-conductive insulation material. In fact, it is possible that none of insulation layer 220 is situated between electrodes. Rather, insulation layer 220 is situated between the electrodes 218 and the foreign object 214.

Figure 6A:
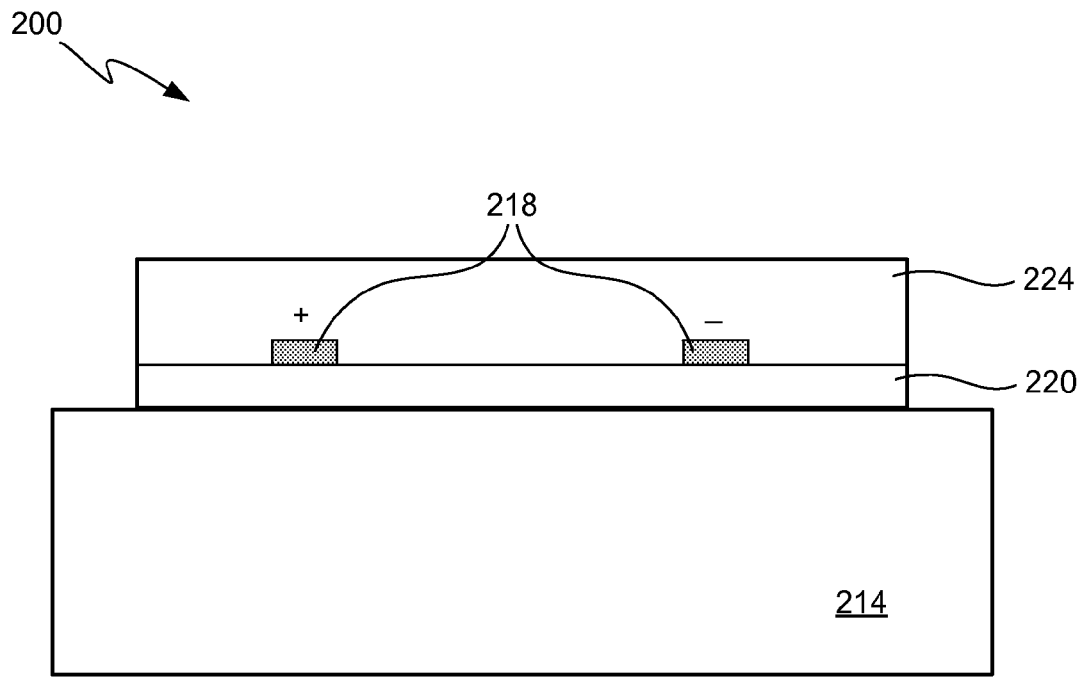
FIG. 6A illustrates in side cross-sectional view an alternative exemplary electroadhesive end effector having a pair of electrodes situated proximate a semi-conductive insulation material according to one embodiment of the present invention.
Figure 6B:
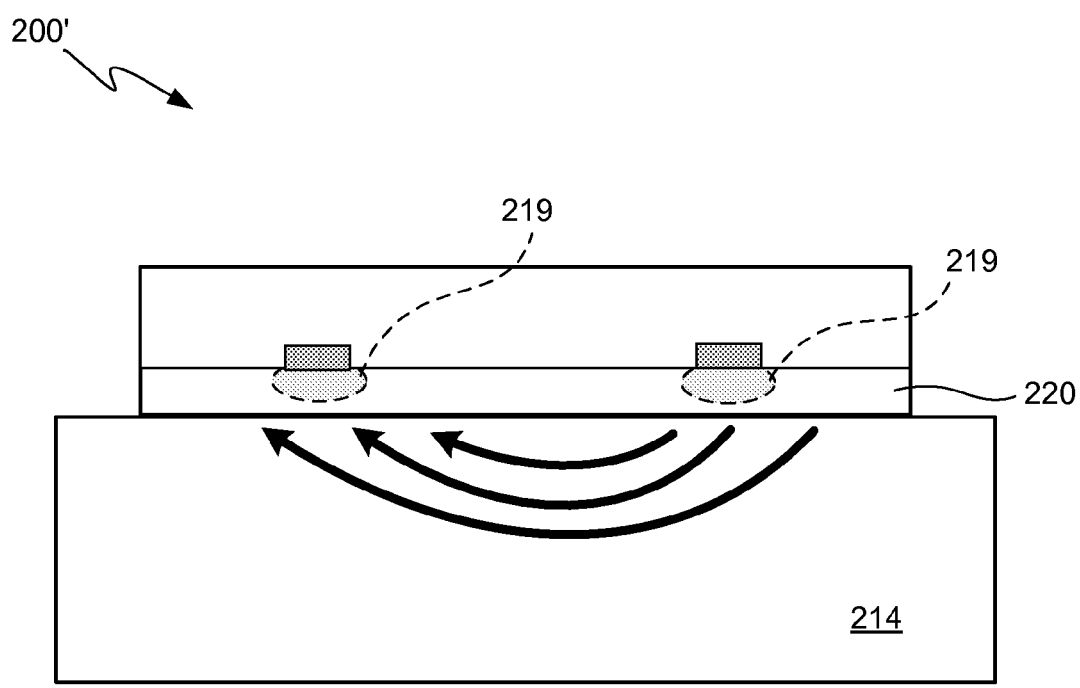
FIG. 6B illustrates in side cross-sectional view an electric field created in the exemplary electroadhesive end effector of FIG. 5A as it is actuated and adhered to a foreign object according to one embodiment of the present invention.

Relative differences in the resulting actuation of electrodes can be observed in FIG. 6B, which depicts an electric field that is generated in the exemplary electroadhesive end effector of FIG. 6A as it is actuated and adhered to a foreign object. As shown, electroadhesive end effector 200' generally represents what occurs when end effector 200 is electrically actuated such that an electrical field from one electrode to the other is created. The conductive electrodes are situated proximate the polyurethane or other semi-conductive material 220, which again is sufficiently conductive at locations that are right next to the electrodes to provide good clamping, but is insulating enough to not cause unacceptably high power draw or shorting at locations that are significantly distant from the electrodes.

Similar to the foregoing embodiment, the areas in the semi-conductive insulator 220 that become conductive when the electrodes are actuated are represented as partially conductive regions 219. Because the insulation layer 220 is only between the electrodes and the foreign object 214, however, there is no extension or projection of the electrodes into material above or to the side of the electrodes. Rather, upper portion 224 is not conductive, and as such no electrode extension or effects occur there. In effect, the "extension" or projection effect of the active electrodes into the semi-conductive material occurs only between the electrodes and the foreign object, or between the electrodes in the case of electrostatic clamping. As in the foregoing embodiment, this effectively reduces the distance between the electrodes and the foreign substrate, which in turn increases the amount of electrostatic force that is applied.

Figure 7:
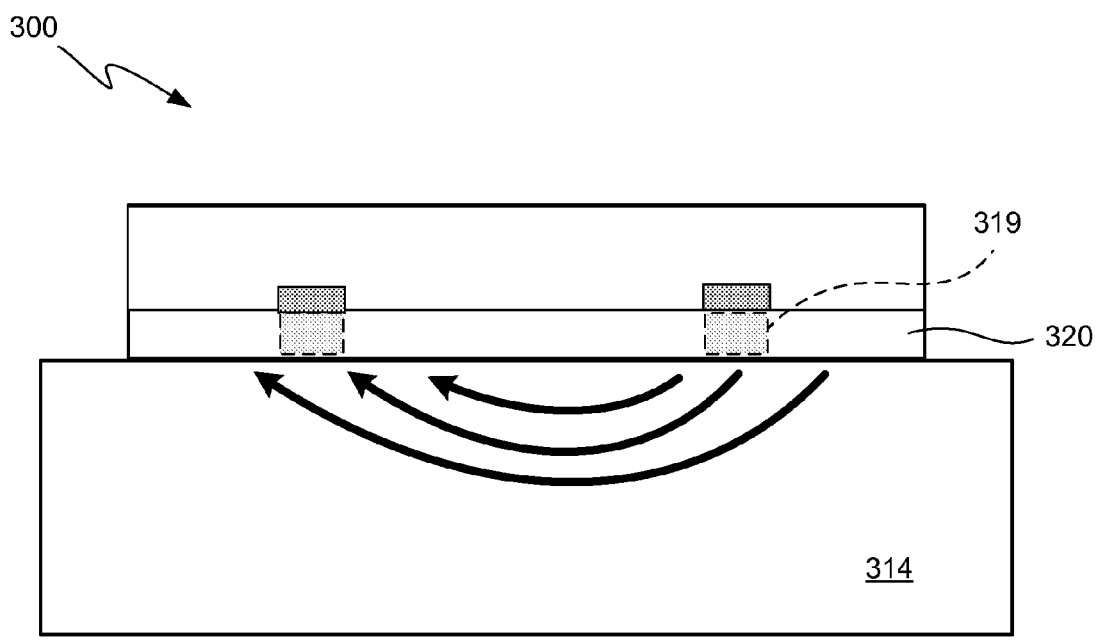
FIG. 7 illustrates in side cross-sectional view an electric field created in yet another exemplary electroadhesive end effector having a pair of electrodes situated proximate a semi-conductive insulation material having a resistance gradient according to one embodiment of the present invention.

FIG. 7 illustrates in side cross-sectional view an electric field created in yet another exemplary electroadhesive end effector having a pair of electrodes situated proximate a semi-conductive insulation material having a resistance gradient according to one embodiment of the present invention. As in the foregoing embodiments, electroadhesive end effector 300 includes a pair of electrodes 318 adapted to provide an electroadhesive force with respect to a foreign object 314. Again, the electrodes can be electrically conductive, while the upper portion is not electrically conductive. An insulation layer 320 formed from a semi-conductive insulation material can similarly be situated between the electrodes and the foreign object. Insulation layer 320 can have a non-uniform or non-homogenous distribution of material, such that the actual resistance varies from one location within the insulation material to another. Such a resistance "gradient" within the material can be intentionally created, so as to position the least resistive areas in strategic locations with respect to the electrodes and the outer surface of the device.

As shown, the least resistive areas in insulation layer 320 are formed directly beneath the electrodes, such that partially conductive regions 319 result when the electrodes are actuated. The manipulation of non-uniform resistivity in the insulation layer 320 can result in partially conductive regions 319 that are sized and shaped in a customizable manner, which can result in more focused and effective electrode "expansion" for purposes of creating stronger, safer and more reliable electroadhesive forces during actuation. For example, while the conductive regions 219 in end effector 200 extend out into the semi-conductive material in all directions near the electrodes, the conductive regions 319 in end effector 300 are limited to focused "via" type arrangements located directly beneath the electrodes only.

In some embodiments, the insulation layer can be permanently formed as a part of the end effector or other electroadhesive arrangement. Various embodiments can alternatively include the use of deposition or sprayed on insulator coatings, which can be temporary and/or recyclable in some instances Such insulator coatings can involve the use of, for example, graphite, indium tin oxide, or quaternary salts embedded in a polymeric mixture, or even water vapor. Such sprayed on coatings could then resemble that which is set forth in FIG. 6B with respect to partial conductivity in the coating. In various embodiments, the sprayed on coating can be applied to the electroadhesive device, while in these or other embodiments, the sprayed on coating can be applied to the foreign substrate surface.

Electroadhesive Electrode Materials

In addition to the use of highly resistive materials in adhesive layers, semiconducting materials with different properties can also provide benefits when strategically applied as the electrodes themselves. As noted above, user safety is a significant concern for many electroadhesion applications. Device safety, such as fault tolerance in the face of a single insulator breakdown or short, is another significant concern. As such, it is desirable to have electrodes that are highly resistant, at least at the surfaces where a user or other electrodes might come into contact with them. Various polyurethanes or other materials can be used at least on the surfaces of one or more electrodes to achieve such a result. The use of an electrostatic dissipative tape ("ESD tape") as electrodes can also allow high voltages to be transferred for electrostatic clamping without requiring a current level that could be harmful to a user or provide a single point of failure of the insulating layer.

For the highly resistive electrodes, a preferable static-dissipating conductive strip material should have a surface resistivity ranging from about 0.1 to 1000 Mohm/square, a thickness of about 1 to 500 micrometers, be relatively inexpensive and readily available, and be mechanically and electrically robust. More preferably, the surface resistivity can range from 1 to 100 Mohm/square. It is specifically contemplated that carbon particles mixed with relatively soft polyurethanes works well for such electrodes. Such polyurethanes can be sprayed on, dip coated or otherwise applied to the appropriate electrode surfaces in any suitable manner. Other alternatives for electrode materials can utilize nanotubes, which should be conductive at much lower loading levels. Still another option is to rub on graphite electrodes and then spray on a thin coating as a sealing layer. Such a sealing layer can include very low carbon black loading, or alternatively none at all. Other options can involve adding a plasticizer or a soft polyurethane blended in tetrahydrofuran ("THF"). Diisooctyl phthalate ("DIOP") could also be used as such a polyurethane plasticizer. Various specific examples of materials that have been found to work well include the Dupont 100XC10E7, the Scicron ABF-300 and the TMF-300 materials.

In addition to the foregoing, various electrodes can include one or more cilium or cilia configured to deform to the surface of the foreign substrate when the electrostatic adhesion voltage is applied. Such cilia can be conductive, or can be insulating cilia that are backed on a conductive material. In various applications, one set of cilia on a first electrode can be set for a first voltage, while a second set of cilia on a second electrode can be set at a second different voltage.

Various additional embodiments can utilize ion conductors for the electroadhesive clamping device or system. An ion source can be used to provide ions through various suitable solids, such as some polymers, for example. In addition or alternatively, the ion source can be adapted to provide ions through air, such that the ion source can supply a non-contact electroadhesive electrode with a charge.

While highly resistant electrodes can be preferable for safety reasons, an additional reason to use highly resistive electrodes can involve fault tolerance issues. For example, where a highly conductive layer or electrode distributes charge over an insulating layer disposed between the conductive layer and a foreign substrate, a breakdown in the insulation layer can result in a catastrophic failure. Such a breakdown can be due to a puncture or other defect in the insulating layer, or just an electrical overwhelming of the semi-conductive material. This can cause a shorting of the system, a shock to the user, or other potential hazards. As such, the use of highly resistant electrodes can also provide a fault tolerance with respect to possible failures of the semi-conduction insulation layer.

Figure 8:
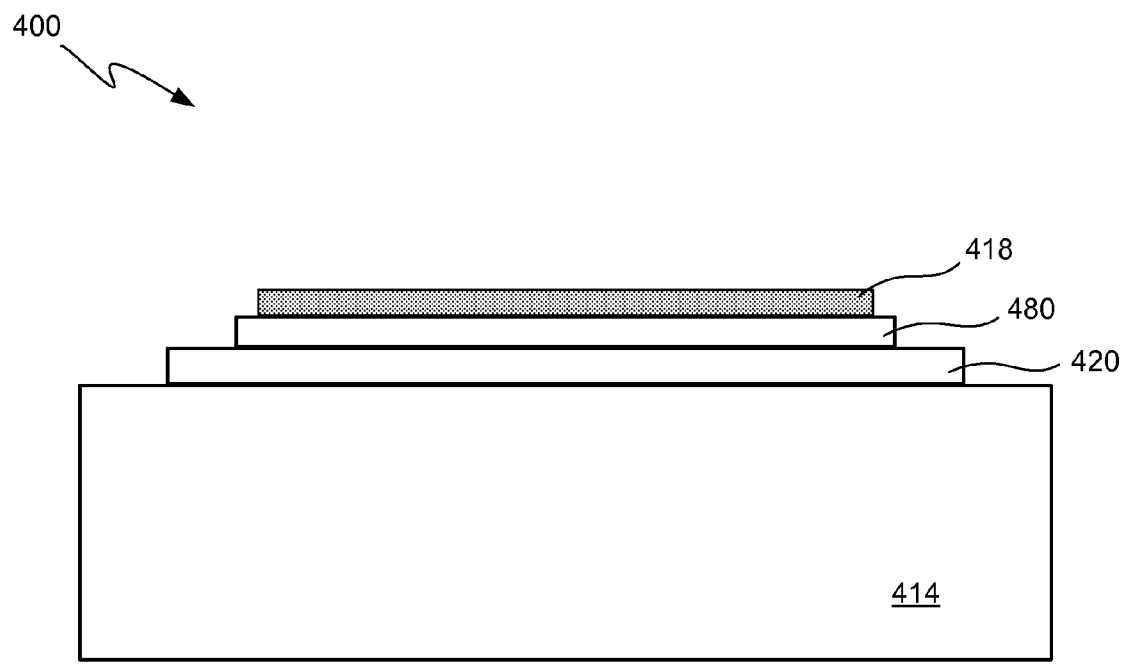
FIG. 8 illustrates in side cross-sectional view an alternative exemplary electroadhesive end effector arrangement including a semi-conductive insulation layer and a highly resistive layer according to one embodiment of the present invention.

FIG. 8 illustrates in side cross-sectional view an alternative exemplary electroadhesive end effector arrangement including a semi-conductive insulation layer and a highly resistive layer according to one embodiment of the present invention. Electroadhesive system 400 includes a conductive layer or electrode 418, a semi-conductive insulation layer 420 and a foreign object 414. A highly resistive layer 480 can be coated onto the electrode 418 or otherwise situated between the electrode and the insulation layer 410. This highly resistive layer 480 can be adapted to prevent catastrophic failure due to a problem in the semi-conductive insulation layer 420. While a problem in the insulation layer can result in a localized increase in current draw, the overall clamp can continue to function properly due to the existence of highly resistive fault tolerant layer 480. Such a highly resistive layer can be made using, for example, carbon black distributed in an elastomer such as silicone. In various embodiments, the highly resistive layer has a resistance of about 0.1 to 100 Mohm/square. In alternative embodiments, fault tolerance can be provided by using ultrathin electrodes on polymer that vaporize locally when there is a breakdown.

Another way to obtain fault tolerance is through the use of multiple layers of electrodes that provide additional structure through the thickness of the material itself. In such arrangements, the electrode layer closest to the insulator can be highly resistive, with a patterned but more conductive electrode thereabove, which allows for rapid distribution of the voltage from the power supply while still maintaining the fault tolerance of the highly resistive electrode. Various examples of such multiple layered electrodes are provided in FIGS. 9A and 9B, which illustrate in side cross-sectional view the use of multi-layered electrodes in an electroadhesion configuration and in an electrostatic clamping or electrolaminate configuration respectively.

FIG. 9A depicts electroadhesion system 500 that includes an electroadhesive end effector 510 configured to be adhered to a foreign substrate 514, while FIG. 9B depicts electrostatic clamping system 550 that includes a first clamping structure or electrolaminate component 591 and a second clamping structure or electrolaminate component 592. Both systems 500, 550 include the use of semi-conductive insulating layers 520, optionally semi-conductive and insulating backing layers 524, and a plurality of multiple layer electrodes 554-518-552. Such multiple layer electrodes can include highly conductive electrode layers 518, which can be sandwiched between one or more resistive electrode layers 552, 554. As shown, the highly conductive electrode layers 518 can be smaller in spatial area than the more resistive electrode layers 552, 554 adjacent to them. This arrangement can be provided such that the user and the insulator are not exposed even at the edges of the highly conductive electrode. This type of electrode structure can be especially useful in applications where the optimum electrode pattern is comprised of many narrow and long lines, such as where electroadherance is being made to a plastic or other non-conductive object. For these purposes, a highly conductive electrode is one having a resistance of less than about 1 Mohm/square.

Further details on such multi-layered and structured electrodes can be found in, for example, commonly owned U.S. Pat. No. 6,376,971, which is incorporated by reference herein in its entirety and for all purposes.

Method of Use

Figure 10:
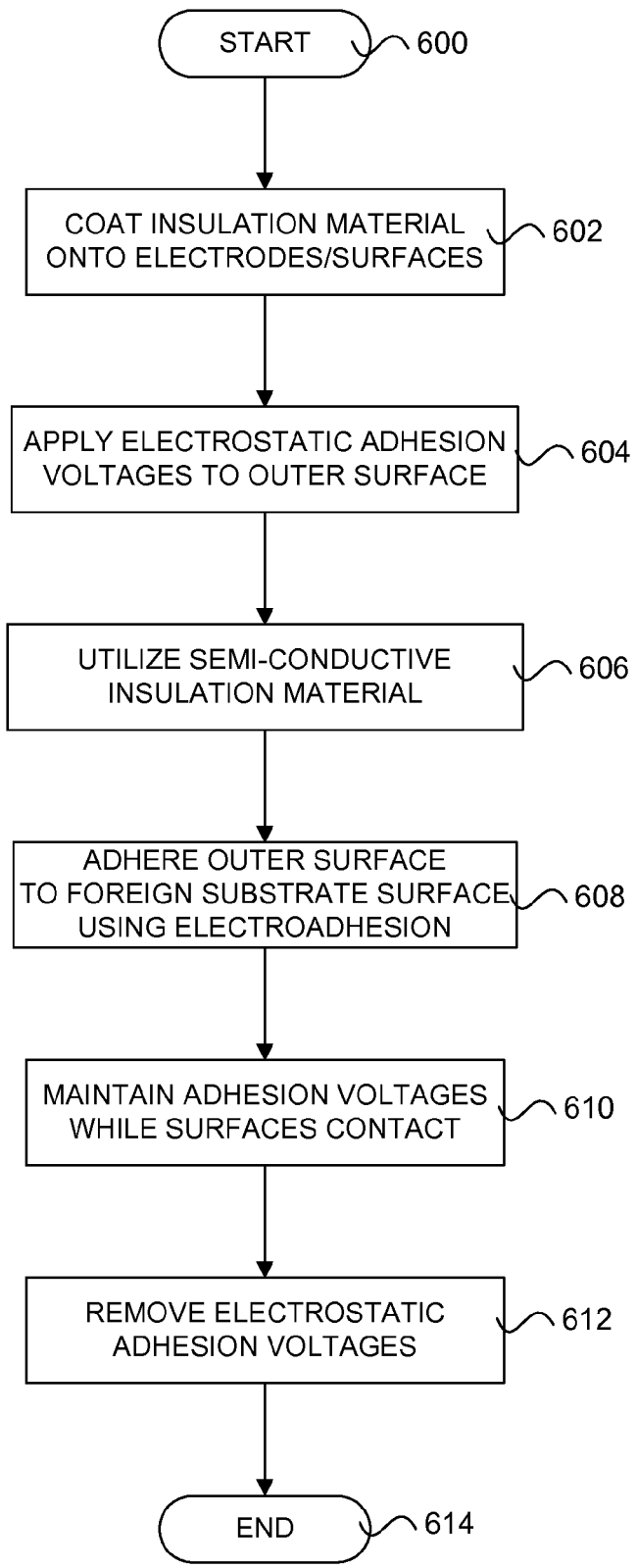
FIG. 10 provides a flowchart of an exemplary method of adhering a device to a foreign substrate according to one embodiment of the present invention

Although an immense variety of applications involving electroadhesion to adhere a given device to a foreign substrate can be imagined, one basic method using a semi-conductive insulator is provided here as an example. Turning lastly to FIG. 10, a flowchart of an exemplary method of adhering a device to a foreign substrate according to one embodiment of the present invention is provided. It will be readily appreciated that not every method step set forth in this flowchart is always necessary, and that further steps not set forth herein may also be included. Furthermore, the exact order of steps may be altered as desired for various applications.

Beginning with a start step 600, a semi-conductive insulation material can be sprayed, deposited or otherwise coated onto the outside of one or more electrodes and/or the surface of the foreign substrate at process step 602. Again, such a coating can be optional, and may be a temporary or permanent coating. At subsequent process step 604, an electrostatic adhesion voltage is applied to the outer surface by way of the appropriate electrodes. At process step 606, the semi-conductive insulation material is utilized as part of the electroadhesive force creation process. This can include, for example, the insulation material effectively operating to expand the conductive volumes of the respective electrodes into the insulation material.

The outer surface of the device is then placed proximate to a suitable foreign substrate surface, and the device and foreign substrate are adhered together at process step 608. The adhesion voltages are maintained for as long as the adherence between the device and foreign substrate is desired at process step 610. When it is desired to remove the device from the foreign substance, or when electroadhesion is no longer desired for any reason, the electrostatic adhesion voltages are then turned off or otherwise removed at process step 612.

The method then finishes at and end step 614. Further steps not depicted can include, for example, removing the electroadhesive end effector from the foreign object, or reducing or varying the applied electroadhesive voltage or force depending upon the given application. Other steps can include utilizing electrodes having high resistivity and/or cilia, as may be desired.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. An electroadhesive device, comprising:
    an outer surface adapted to interface with a surface of a foreign substrate;
    a first electrode having a first conductive volume and configured to apply a first voltage at a first location of the outer surface, said first electrode having a surface resistance of about 0.1 to 1000 Mohm/square;
    a second electrode having a second conductive volume and configured to apply a second voltage at a second location of the outer surface, said second electrode having a surface resistance of about 0.1 to 1000 Mohm/square, wherein the difference in voltage between the first voltage and second voltage includes an electrostatic adhesion voltage that produces an electrostatic force between the device and the substrate that is suitable to maintain a current position of the device relative to the substrate; and
    an insulation layer disposed adjacent to at least one of the first electrode and the second electrode, wherein said insulation layer includes a semi-conductive material having a bulk resistivity of about $10^9$ to $10^{12}$ ohms*m and has a non-homogeneous or non-uniform distribution of material, and wherein partially conductive regions form in the insulation layer next to the electrodes when the electrodes are actuated.

2. The electroadhesive device of claim 1, wherein the insulation layer is disposed between the first electrode and the second electrode.

3. The electroadhesive device of claim 2, wherein the first electrode and the second electrode are embedded within the insulation layer.

4. The electroadhesive device of claim 1, wherein the insulation layer is disposed between the outer surface and at least one of the first electrode and the second electrode.

5. The electroadhesive device of claim 1, wherein the partially conductive regions formed in the insulation layer when the electrodes are actuated effectively operate to expand the first conductive volume and the second conductive volume into the insulation layer.

6. The electroadhesive device of claim 1, wherein the formation of partially conductive regions in the insulation layer when the electrodes are actuated does not result in an electrical short.

7. The electroadhesive device of claim 1, wherein the insulation layer has a resistance that varies from one location within the insulation layer to another.

8. The electroadhesive device of claim 7, wherein one or more regions of the insulation layer that are closer to one or both of said first and second electrodes have a resistance that is lower than one or more regions of the insulation layer that are farther away from the respective electrode or electrodes.

9. The electroadhesive device of claim 1, wherein the electroadhesive device is adapted to provide enough electrostatic force between the device and the foreign substrate sufficient to maintain a current position of the device relative to the substrate despite the presence of moisture or a particulate disposed between the outer surface and the surface of the foreign substrate.

10. The electroadhesive device of claim 1, wherein the insulation layer includes a compliant material with an elastic modulus less than about 1 GPa.

11. The electroadhesive device of claim 1, wherein the insulation layer comprises polyurethane.

12. The electroadhesive device of claim 1, wherein the insulation layer comprises a coating that is sprayed or deposited onto the first electrode, the second electrode, or both.

13. The electroadhesive device of claim 1, wherein the electrodes include one or more cilium configured to deform to the surface of the foreign substrate when the electrostatic adhesion voltage is applied.

14. The electroadhesive device of claim 1, further comprising:
a highly resistive layer disposed between said first and second electrodes and said insulation layer, wherein said highly resistive layer has a resistance of about 0.1 to 100 Mohm/square.

15. A method of adhering a device to a substrate, comprising:
applying an electrostatic adhesion voltage difference between a first electrode at a first location of an outer surface of the device and a second electrode at a second location of the outer surface, wherein said first and second electrodes have a surface resistance of about 0.1 to 1000 Mohm/square;
utilizing an insulation layer disposed adjacent to at least one of the first electrode and the second electrode, wherein said insulation layer includes a semi-conductive material having a bulk resistivity of about $10^9$ to $10^{12}$ ohms*m and has a non-homogeneous or non-uniform distribution of material, and wherein partially conductive regions form in the insulation layer next to the electrodes when the electrodes are actuated;
adhering the outer surface to a surface of the substrate using an electrostatic attraction force provided by the electrostatic adhesion voltage difference; and
maintaining the electrostatic adhesion voltage difference between the first electrode and the second electrode while the outer surface of the device contacts the surface of the substrate.

16. The method of claim 15, wherein the insulation layer is disposed between the first electrode and the second electrode.

17. The method of claim 15, wherein the partially conductive regions formed in the insulation layer when the electrodes are actuated effectively operate to expand the conductive volumes of the electrodes into the insulation layer.

18. The method of claim 15, wherein the insulation layer comprises polyurethane.

19. The method of claim 15, further comprising the step of:
spraying or depositing the insulation layer as a coating onto the first electrode, the second electrode, the surface of the foreign substrate, or any combination thereof.

20. An electroadhesive system, comprising:
a first electrolaminate component having a first outer surface and at least a first electrode having a first conductive volume and configured to apply a first voltage at the first outer surface, wherein said first electrode has a surface resistance of about 0.1 to 1000 Mohm/square;
a second separate electrolaminate component having a second outer surface and at least a second electrode having a second conductive volume and configured to apply a second voltage at the second outer surface, wherein said second electrode has a surface resistance of about 0.1 to 1000 Mohm/square, wherein said second electrolaminate component is adapted to interface with said first electrolaminate component such that the difference in voltage between the first voltage and second voltage includes an electrostatic adhesion voltage that produces an electrostatic force between the first and second electrolaminate components that is suitable to maintain a current position of the first and second electrolaminate components with respect to each other; and
an insulation layer disposed adjacent to at least one of the first electrolaminate component and second electrolaminate component, wherein said insulation layer includes a semi-conductive material having a bulk resistivity of about $10^9$ to $10^{12}$ ohms*m and has a non-homogeneous or non-uniform distribution of material, and wherein partially conductive regions form in the insulation layer next to the electrodes when the electrodes are actuated.

21. The electroadhesive system of claim 20, wherein the insulation layer is disposed between the first electrolaminate component and second electrolaminate component.

22. The electroadhesive system of claim 20, wherein each of the first electrolaminate component and second electrolaminate component has its own separate insulation layer associated therewith.

23. The electroadhesive system of claim 20, wherein the partially conductive regions formed in the insulation layer when the electrodes are actuated effectively operate to expand the first conductive volume, the second conductive volume, or both, into the insulation layer.

24. The electroadhesive system of claim 20, wherein the insulation layer comprises polyurethane.

25. The electroadhesive system of claim 20, wherein the insulation layer comprises a coating that is sprayed or deposited onto the first electrolaminate component, the second electrolaminate component, or both.

* * * * *